Jan. 16, 1940.  M. DAVIS  2,187,226
VEHICLE BRAKE
Filed Sept. 29, 1937   3 Sheets-Sheet 1

INVENTOR.
Merrill Davis
BY Daniel Hullen
ATTORNEY.

Jan. 16, 1940.   M. DAVIS   2,187,226
VEHICLE BRAKE
Filed Sept. 29, 1937   3 Sheets-Sheet 2

INVENTOR.
Merrill Davis
BY Daniel G. Cullen
ATTORNEY

Jan. 16, 1940.　　　　M. DAVIS　　　　2,187,226
VEHICLE BRAKE
Filed Sept. 29, 1937　　　3 Sheets-Sheet 3

INVENTOR.
Merrill Davis
BY Daniel G. Cullen
ATTORNEY.

Patented Jan. 16, 1940

2,187,226

UNITED STATES PATENT OFFICE 2,187,226

VEHICLE BRAKE

Merrill Davis, Detroit, Mich.

Application September 29, 1937, Serial No. 166,261

13 Claims. (Cl. 188—152)

This application relates to brakes and more particularly to brakes of the internal expanding type.

A principal object of the present invention is to provide for the internal expanding brake band of such a brake a novel expanding arrangement including an expanding structure comprising a strap corrugated or formed to provide a hub and several circumferentially-spaced radially movable spokes which when moved towards the brake band in a radial direction by expansion of the structure engage the band at several circumferentially spaced points and expand it, the brake having therein means for moving the spokes simultaneously.

Such means may be operated by a fluid pressure arrangement or by a mechanical arrangement not including fluid pressure parts. For fluid pressure operation there is disposed within the hub a fluid pressure expansible chamber which may be manipulated to expand the hub and move the spokes radially outwardly simultaneously. For mechanical operation, there is provided a cam ring having cams individually engaging the spokes and so arranged that when the ring is rotated its cams will bias the spokes radially outwardly simultaneously; any suitable mechanical linkage may be employed for rotating the cam ring.

The fluid pressure operating arrangement and the mechanical operating arrangement are constructed so as to be independently operable whereby the brake may be operated alternatively as desired by operation of either means. Provision of the last mentioned feature entitles the brake hereof to be considered as a safety brake in that in the event of failure of either arrangement for operating the brake, the other arrangement is automatically and constantly available for brake operation.

Figure 1:
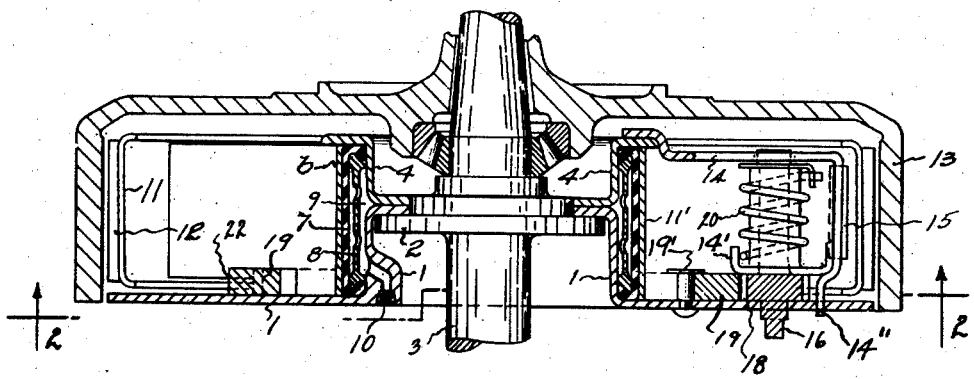
Figure 2:
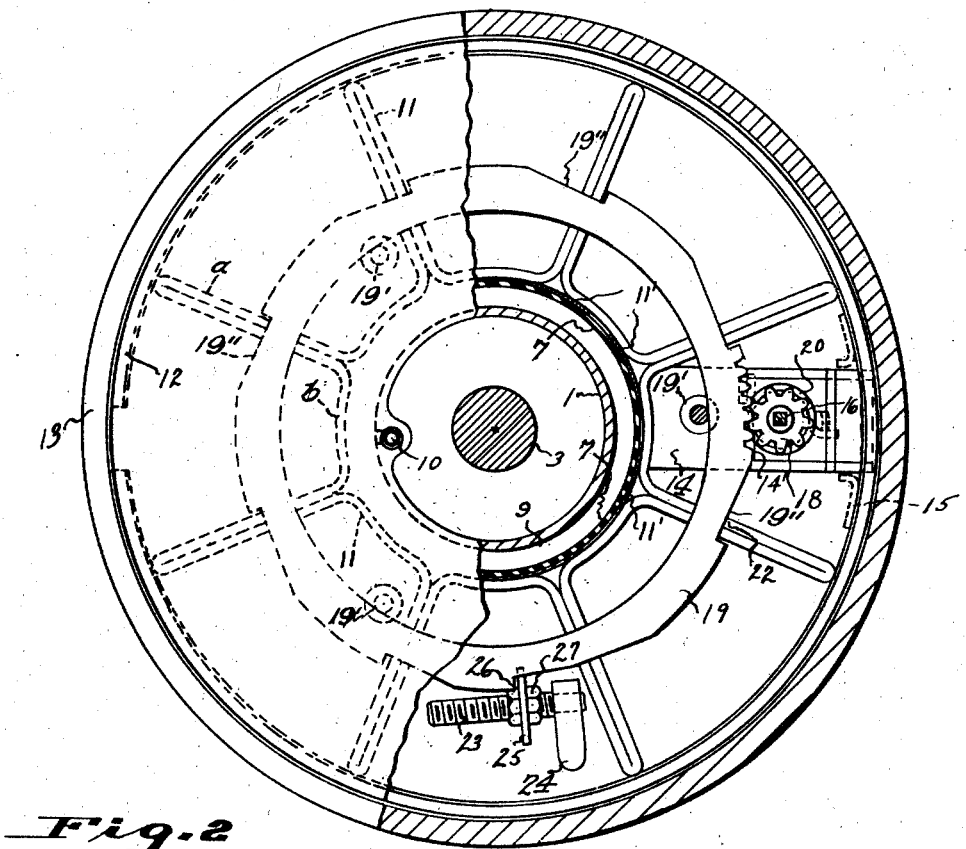
Figure 3:
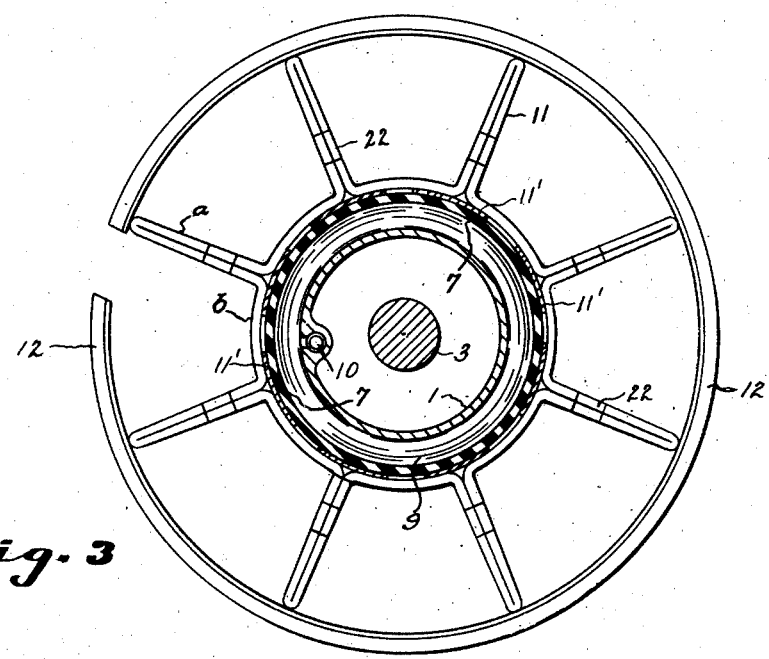
Figure 4:
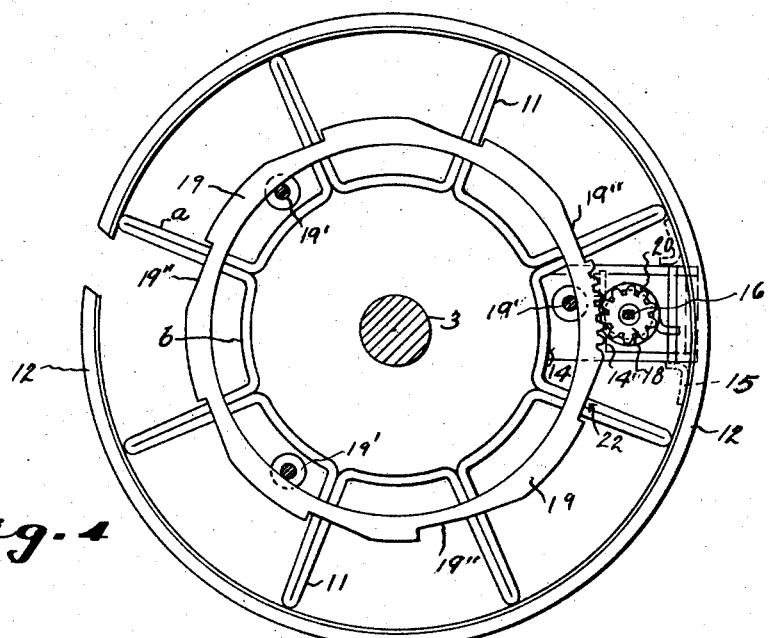
Figure 5:
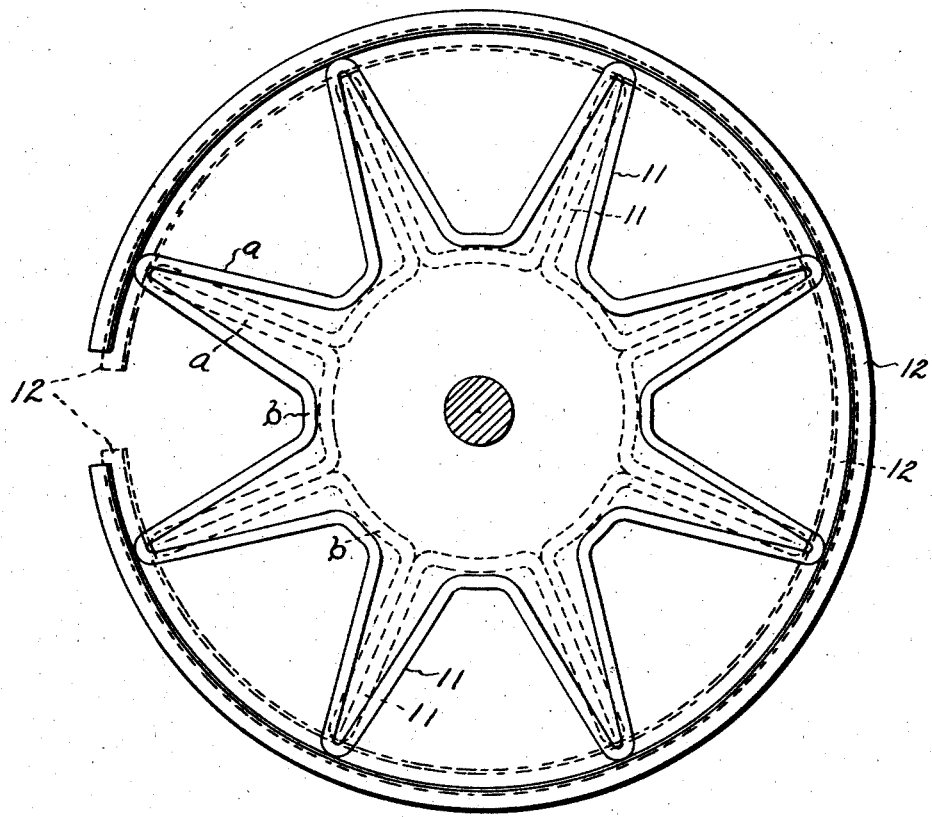

Further objects of the invention relate to details of construction which will hereinafter be described by reference to the appended drawings. In these drawings:

Fig. 1 is a section view of the brake;

Figs. 2, 3, and 4 are sections on lines 2—2 of Fig. 1; Fig. 2 shows the brake with both the fluid pressure operating arrangement and the mechanical operating arrangement in place; Fig. 3 shows the brake with only the fluid pressure operating arrangement: Fig. 4 shows it with only the mechanical operating arrangement; in all figures parts are omitted for the sake of clarity;

Fig. 5 is a diagrammatic view illustrating the action of the expanding structure.

Referring to these drawings it will be seen that the brake hereof includes a closure disc member 1 having an annular hub in a flange of which is a center hole whose edge is secured to a shoulder 2 formed on the shaft 3. An annular member 4 secured to the member 1 by rivets not shown is also secured to the shaft at the shoulder 2. Between flat parts of the members 1 and 4 is secured an annular diaphragm 7 of elastic material, such as rubber, and such diaphragm has its opposite annular edges flanged inwardly so as to be clamped against the flat parts of members 1 and 4 by a perforated clamping ring 8 disposed within the diaphragm 7. Thus there is formed around the axially extending annular parts of the members 1 and 4 a tightly sealed leak-proof annular fluid pressure chamber 9 into which fluid may be admitted from a supply line (not shown) through a conduit or passage indicated at 10 and formed integrally in a boss of the annular hub of the closure disc member 1.

Surrounding the diaphragm is an expanding structure 11 providing the spoke and hub arrangement. The part 11 comprises a single strap folded and formed to provide a plurality of radially extending circumferentially spaced spokes $a$ and a central hub $b$. The free ends of the spokes are disposed in engagement with the interior surface of an internal expanding brake band 12 which has its outer surface provided with a suitable friction material for brake lining and which is formed to be almost 360 degrees in length, the gap between the ends of the brake band or shoe being only a relatively few degrees in length as indicated in Figs. 2–4. The friction surface on the band, when the band is expanded, engages the inner surface of the rotary brake drum 13 to produce the desired braking action and the degree of expansion of the brake band 12 is controlled by the expansion of the structure 11 effecting outward movement of the spokes $a$ in a radial direction.

Such movement may be provided by fluid pressure operation and expansion of the chamber 9, with the diaphragm 7 operating on the hub $b$ through the medium of bridging plates 11' disposed between the diaphragm 7 and the hub at the inner ends of the spokes $a$. This operation is one of the two operations that are here shown for expanding the structure 11 and for moving the spokes $a$ radially outwardly simultaneously to expand the band 12 for braking action.

The other operation for expanding the structure 11 and thus moving the spokes outwardly for braking action does not depend upon fluid pressure but is strictly a mechanical operation provided by a mechanical arrangement which will now be described. Such arrangement includes a supporting strip 14 bent to L form and having one end secured to a flat part of the annular member 4, and its other end anchored to disc 1, and in turn supporting a plate 14' integrally secured to it. The supporting strip 14 is prevented from moving circumferentially by having a portion 14" formed as a tongue projected through a slot of disc 1; strip 14 is disposed between abutment members 15 integrally secured to the inner surface of the brake band 12. The legs of the U formed by the supporting strip 14—14' extend across the annular space between the hub b and the brake band and are relatively spaced, axially of the shaft. These legs form bearings for the ends of a shaft 16 formed with an integral pinion 18 meshing with the toothed portion of a cam ring 19 supported on the disc 1 and anchored thereto by headed pins 19' whereby rotation of the shaft 16 on its axis will cause rotation of the cam ring.

For rotating the shaft 16 any suitable operating or actuating lever and rod arrangement may be employed.

For restraining rotation of the shaft 16 for this purpose and for returning it there is wound around the shaft a coiled spring 20, one end of which interlocks to a portion formed integral with the supporting strip 14 and the other end of which may be interlocked to the shaft 16 or the cam ring 19.

The cam ring 19 is seated in slots cut in the lower edges of the spokes a and has its outer edge formed with a plurality of cams 19" which engage edges 22 of the spoke slots. It will be observed that rotation of the shaft 16 by any suitable means acts through the mechanical arrangement shown, comprising the pinion 18 and the cam ring 19, to cause the cam rings 19" to effect outward movement of the spokes a and consequently to effect expansion of the brake band 12.

For limiting movement of the cam ring circularly and for providing an adjustment of the position of the brake band to compensate for wear there is provided an arrangement including a screw 23 secured at one end to a block 24 integrally secured to the disc member 1. Slidably disposed on the screw 23 is a washer 25 engaging a shoulder 26 of the cam ring, and nuts 27 threaded on the screw 23 determine the position of the washer 25 and consequently the circular position of the cam ring 19 with respect to the member 1.

It will be observed that the brake hereof, characterized as being of the internal expanding type, has its annual brake drum 12, almost 360 degrees in length, expanded by either of two separate and independent expanding arrangements, one of which is a fluid pressure arrangement operating to expand the diaphragm 7 and consequently the structure 11 for moving the spokes a outwardly, and the other of which is a mechanical arrangement which operates by rotation of the pinion shaft 16 to rotate the cam ring and thus expand the structure 11 and thus bias the spokes outwardly. Either means for expanding the structure 11 and thus moving the spokes outwardly may be used independently of the other.

It will also be observed that by virtue of the multiple spoke expanding arrangement for the brake band, the expanding pressure on the band is applied at a plurality of circumferentially spaced points evenly and simultaneously.

It will also be observed that the cam ring functions not only as part of the mechanical arrangement for expanding structure 11 and moving the spokes outwardly but also as an adjusting or limiting means to limit the return of the spokes inwardly after they had been moved outwardly, either by fluid pressure actuation and expansion of the diaphragm and hub, or by mechanical operation.

Now having described the brake herein disclosed reference should be had to the claims which follow for determining the scope of the inventions.

I claim:

1. In a brake structure, the combination of a shaft, a rotatable member mounted thereon, a brake structure consisting in part of two companion members so shaped that when together they will form three walls of an annular channel, means for securing the two members in assembled position, and fluid passage means into said channel. A cylinder of flexible material having inwardly disposed flanged ends and a perforated metal cylinder of smaller diameter mounted interiorly thereof and of such length that its ends will contact the inner surfaces of the flanged ends of said flexible cylinder in such manner that when positioned between said companion members the act of bringing the companion members together will press the flanged ends of the flexible cylinder into sealed relationship between the ends of the perforated metal cylinder and the walls of the companion members.

2. In a brake structure, the combination of a shaft, carrying a rotatable member formed in part by an annular ring, a brake band mounted interiorly of said ring, an expandible annular chamber around said shaft, a continuous and circumferentially expandible pressure transfer member having radially extending and tightly closed folded portions terminating at the interior wall of brake band and arcuate portions in contact with and forming in combination a wall to circumferentially enclose said expansible chamber.

3. In a brake structure, in combination with an annular and circumferentially expandible fluid chamber and an arcuate brake band, a pressure transmitting and radially expandible spacing unit having radially disposed and tightly closed folded portions contacting at their terminus with the interior of said brake band, and forming at their inner terminus a circular wall adapted to enclose the outer circumference of said fluid chamber and cooperative means in each of said folded portions to effect a stoppage of radially inward movement.

4. In a brake structure, the combination of a stationary member secured to a shaft, a radially expandible spacing unit, having arcuate formed portions that in combination will form an annulus, sharp bends at each end of each arcuate portion forming outwardly extending and tightly folded legs, cooperative means in each of said legs to effect a stoppage of radially inward movement, a ring shaped member rotatably mounted on said stationary member and positioned at one end of said spacing unit, inclined planes in the outer periphery of said ring, spaced in conformity with the legs of said spacing unit and positioned so that each of said inclined planes will engage one of said cooperative means to effect a stoppage of inwardly directed movement, and cooperative means in said ring to effect a rotation thereof.

5. In a brake structure, the combination of a stationary member secured to a shaft, a radially expandible spacing unit having a plurality of outwardly extending legs formed by tightly folding together portions of said spacing unit, cooperative means in each leg to stop a radial inward movement therein, a ring shaped member rotatably mounted on said stationary member, inclined planes in said ring spaced to match and engage with cooperating means in the legs of said spacing unit, cooperative means in said ring to effect a rotation therein, a shaft rotatably mounted on said stationary member, a toothed wheel secured to said shaft and adapted to engage the cooperative means in said ring so that a rotary movement may be imparted thereto by a turning movement of said shaft, and means on one end of said shaft whereby it may be turned by external means.

6. In a brake structure, the combination of a stationary member secured to a shaft, a radially expandible spacing unit having a plurality of outwardly extended legs formed by closely folded portions of the spacing unit, cooperative means in each leg to stop an inwardly directed movement therein, a ring shaped member rotatably mounted on said stationary member and at one end of said spacing unit, inclined planes in said ring spaced to match and engage said cooperative means in the legs of said spacing unit, cooperative means in said ring to effect a rotation thereof, a shaft rotatably mounted on said stationary member, a toothed wheel secured to said shaft and adapted to engage with said cooperative means in said ring so that a turning movement may be imparted thereto, means on one end of said shaft whereby a rotation may be imparted thereto by external means, and spring actuated means for imparting a counterwise rotation to said shaft.

7. An internal expanding brake having an annular brake drum, a single brake band of approximately 360° in length therein, and means within the band for expanding it comprising a plurality of circumferentially spaced radially arranged spokes which when moved towards the band in a radial direction engage it at several circumferentially spaced points and expand it, and means for moving the spokes towards the band, the means comprising a ring having circumferentially spaced cams on its exterior edge arranged to cooperate with cam shoulders on said spokes, whereby rotation of the ring circularly around its own axis causes the cams of the ring to engage the shoulders and force the spokes outwardly.

8. An internal expanding brake having an annular brake drum, a brake band therein, and means within the band for expanding it comprising an expandible structure in the form of a ribbon having a hub and a plurality of circumferentially spaced radially arranged spokes in the form of folded ribs integral with said hub, the spokes, when moved towards the band in a radial direction by expanding of the hub, engage the band at several circumferentially spaced points and expand it, and means for expanding the hub for moving the spokes towards the band simultaneously.

9. An external expanding brake having an annular brake drum, a brake band therein, and means within the band for expanding it comprising an expandible structure in the form of a ribbon having a hub and a plurality of circumferentially spaced radially arranged spokes in the form of folded ribs integral with said hub, the spokes, when moved towards the band in a radial direction by expanding of the hub, engage the band at several circumferentially spaced points and expand it, and fluid pressure means within the hub for expanding the hub for moving the spokes towards the band simultaneously.

10. An external expanding brake having an annular brake drum, a brake band therein, and means within the band for expanding it comprising an expandible structure including a plurality of circumferentially spaced radially arranged spokes which when moved towards the band in a radial direction by expanding of the structure engage it at several circumferentially spaced points and expand it, and fluid pressure means for expanding the structure and moving the spokes towards the band simultaneously, the structure also comprising a hub within the band and to which the inner ends of the spokes are connected, the fluid pressure means comprising an annular fluid containing expansible chamber within the hub.

11. An internal expanding brake having an annular brake drum, a brake band therein, and means within the band for expanding it comprising an expandible structure in the form of a ribbon having a hub and a plurality of circumferentially spaced radially arranged spokes in the form of folded ribs integral with said hub, the spokes, when moved towards the band in a radial direction by expanding of the hub, engage the band at several circumferentially spaced points and expand it, and means for moving the spokes towards the band simultaneously, the means comprising a ring having circumferentially spaced cams on its exterior edge arranged to cooperate with cam shoulders on said spokes, whereby rotation of the ring circularly around its own axis causes the cams of the ring to engage the shoulders and force the spokes outwardly.

12. An external expanding brake having an annular brake drum, a brake band therein, and means within the band for expanding it comprising an expandible structure including a plurality of circumferentially spaced radially arranged spokes which when moved towards the band in a radial direction by expanding of the structure engage it at several circumferentially spaced points and expand it, and fluid pressure means for expanding the structure and moving the spokes towards the band simultaneously, the structure also comprising a hub within the band and to which the inner ends of the spokes are connected, the fluid pressure means comprising an annular fluid containing expansible chamber within the hub, and a second means for expanding the structure and moving the spokes towards the band, operable separately and independently of the first mentioned of such means, and comprising a mechanical arrangement, not including fluid pressure parts.

13. An external expanding brake having an annular brake drum, a brake band therein, and means within the band for expanding it comprising an expandible structure including a plurality of circumferentially spaced radially arranged spokes which when moved towards the band in a radial direction by expanding of the structure engage it at several circumferentially spaced points and expand it, and fluid pressure means for expanding the structure and moving the spokes towards the band simultaneously, the structure also comprising a hub within the band and to which the inner ends of the spokes are connected, the fluid pressure means comprising an annular fluid containing expansible chamber within the hub, and a second means for expanding the structure and moving the spokes towards the band, operable separately and independently of the first mentioned of such means, and comprising a mechanical arrangement, not including fluid pressure parts, and formed of a cam ring having cams engaging the spokes and arranged to bias the spokes outwardly when it is rotated, and mechanical means for rotating the cam ring.

MERRILL DAVIS.